United States Patent
Lee

(10) Patent No.: US 8,849,498 B2
(45) Date of Patent: Sep. 30, 2014

(54) METHOD AND SYSTEM FOR DETECTING FAIL OF STEERING ANGLE SENSOR IN ELECTRIC POWER STEERING APPARATUS

(75) Inventor: Jinhwan Lee, Seongnam-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 1623 days.

(21) Appl. No.: 11/891,751

(22) Filed: Aug. 13, 2007

(65) Prior Publication Data

US 2008/0039996 A1 Feb. 14, 2008

(30) Foreign Application Priority Data

Aug. 14, 2006 (KR) .................................. 2006-76861

(51) Int. Cl.
| | | |
|---|---|---|
| G01M 17/00 | (2006.01) | |
| G06F 7/00 | (2006.01) | |
| G06F 19/00 | (2011.01) | |
| B62D 15/02 | (2006.01) | |
| G01L 25/00 | (2006.01) | |
| B62D 5/04 | (2006.01) | |
| G01D 3/08 | (2006.01) | |

(52) U.S. Cl.
CPC .............. B62D 5/049 (2013.01); B62D 15/021 (2013.01); G01L 25/003 (2013.01); G01D 3/08 (2013.01)
USPC ........ 701/29.7; 701/30.3; 701/30.5; 701/30.7

(58) Field of Classification Search
USPC .............. 701/34, 29.1, 29.7, 30.3, 30.5, 30.6, 701/30.7, 30.9, 31.1; 180/6.2, 6.28, 204, 180/404, 405, 443
See application file for complete search history.

(56) References Cited

U.S. PATENT DOCUMENTS

| | | | | |
|---|---|---|---|---|
| 4,869,334 A | * | 9/1989 | Marumoto et al. | 180/446 |
| 4,881,611 A | * | 11/1989 | Nakashima et al. | 180/404 |
| 4,886,291 A | * | 12/1989 | Okamoto | 280/5.501 |
| 6,041,884 A | * | 3/2000 | Shimizu et al. | 180/443 |
| 6,148,949 A | * | 11/2000 | Kobayashi et al. | 180/446 |
| 6,755,276 B2 | * | 6/2004 | Clephas | 180/402 |
| 6,845,309 B2 | * | 1/2005 | Recker et al. | 701/41 |
| 6,847,177 B1 | * | 1/2005 | Gluch et al. | 318/400.01 |
| 6,865,463 B2 | * | 3/2005 | Suzuki | 701/43 |
| 6,983,816 B2 | * | 1/2006 | Takahashi et al. | 180/402 |
| 2003/0100981 A1 | * | 5/2003 | Suzuki | 701/43 |
| 2003/0144780 A1 | * | 7/2003 | Recker et al. | 701/41 |
| 2004/0128042 A1 | * | 7/2004 | Takahashi et al. | 701/41 |
| 2005/0234614 A1 | * | 10/2005 | Sakurai et al. | 701/29 |
| 2006/0196722 A1 | * | 9/2006 | Makabe et al. | 180/443 |

* cited by examiner

*Primary Examiner* — Jason Holloway
*Assistant Examiner* — Nicholas Kiswanto
(74) *Attorney, Agent, or Firm* — McDermott Will & Emery LLP

(57) ABSTRACT

A method and system may detect a fail of a steering angle sensor in an electric power steering apparatus. The system may include: a steering angle sensor for generating and transmitting a steering angle signal measuring a rotation angle of a steering wheel; a motor for generating an assistant power for smooth steering and transmitting a current and a voltage based on rotation of the motor; and an Electronic Control Unit (ECU) for receiving the current and the voltage from the motor, sensing the rotation direction of the motor, receiving the steering angle signal from the steering angle sensor, sensing a first rotation direction of the steering wheel, and then, when the rotation direction of the motor is not equal to the first rotation direction of the steering wheel, determining that the steering angle signal has a fail and starting operation of a fail-safe logic.

11 Claims, 3 Drawing Sheets

METHOD AND SYSTEM FOR DETECTING FAIL OF STEERING ANGLE SENSOR IN ELECTRIC POWER STEERING APPARATUS

RELATED APPLICATION

This application claims priority to Korean patent application No. KR2006-76861 filed on Aug. 14, 2006, the content of which is incorporated by reference.

FIELD OF THE INVENTION

The present invention relates to a method and a system for detecting a fail of a steering angle sensor in an electric power steering apparatus, and more particularly, to a method and a system for operating a fail-safe logic, wherein a rotation direction (a forward direction or a reverse direction) of the motor is detected by receiving a current and a voltage from the motor, a first rotation direction of a steering wheel is detected by receiving a steering angle signal from a steering angle sensor, and then, when the first rotation direction of the steering wheel is not equal to the rotation direction of the motor, the steering angle signal is determined to have a fail and the fail-safe logic is operated.

BACKGROUND OF THE INVENTION

Generally, conventional power steering apparatuses for a vehicle include a hydraulic power steering apparatus using a hydraulic pressure of a hydraulic pump. However, an electric power steering apparatus using an electric power motor has gradually prevailed since the 1990s.

In the conventional hydraulic power steering apparatus, the hydraulic pump serving as a power source supplementing the power is actuated by an engine, so that the energy is always consumed regardless of rotation of a steering wheel. While, in the electric power steering apparatus, when the steering wheel rotates and the torque is generated, the motor actuated by an electric energy supplies the steering assistant power. Therefore, the electric power steering apparatus can improve the energy efficiency of a vehicle rather than the hydraulic power steering apparatus.

In general, an electronic control brake system is a system for efficiently preventing a slip of a vehicle so as to obtain powerful and stable braking force. The electronic controlled brake system includes an Anti-Lock Brake System (ABS) preventing a slip of the wheel upon braking, a Brake Traction Control System (BTCS) preventing a slip of a driving wheel upon suddenly accelerating or accidentally speeding up of a vehicle, and an Electronic Stability Program (ESP) controlling a hydraulic pressure of a brake through combining the ABS with the BTCS so as to stably maintain the driving conditions of a vehicle.

The conventional ESP is an apparatus by which a vehicle itself brakes or controls the engine torque so that it enables a driver to escape from danger in a dangerous driving situation. In other words, the ABS works only when a driver directly steps on the brake of a vehicle and only during a braking process, while the ESP can find the optimum driving of a vehicle by itself, even when a user does not step on the brake.

Meanwhile, in an operating method of the common ESP, a steering angle sensor, a G-sensor for detecting an acceleration in a vertical direction of a vehicle, and a Yaw sensor for sensing inward inclination occurring upon a circular driving of a vehicle sense a rotation speed of a wheel, yawing moment, an angle of a steering wheel, a stepping force of an accelerator, or the like, and then an Electronic Control Unit (ECU) analyzes them. According to an analyzed result, the ECU optimally controls the braking force and the driving force applied to each wheel so as to obtain driving safety of a vehicle.

The conventional steering angle sensor has been mainly employed in the ESP sensing a movement of a vehicle. However, the conventional steering angle sensor has been recently used in a steering system, such as Electric Power Steering (EPS). The steering angle sensor employed in the EPS performs a function of transmitting a steering angle signal measuring a rotation angle of the steering wheel rotated by a driver's operation to the ECU.

Generally, the EPS system employing the steering angle sensor checks if a fail exists in the steering angle signal received from the steering angle sensor. If it does, the EPS system employs a method for operating a fail-safe logic. However, there is a disadvantage that only the conventional method cannot accurately determine if the fail exists in the steering angle signal. Therefore, a method of detecting a malfunction of the steering angle sensor or the fail in the steering angle signal using the rotation direction of the motor in the EPS system employing the steering angle sensor has been required. However, the method still has not been provided.

SUMMARY OF THE INVENTION

Accordingly, the present invention has been made to solve the above-mentioned problems occurring in the prior art, and the present invention provides a method and a system for operating a fail-safe logic, wherein a rotation direction (a forward direction or a reverse direction) of the motor is detected by receiving a current and a voltage from the motor, a first rotation direction of a steering wheel is detected by receiving a steering angle signal from a steering angle sensor, and then, when the first rotation direction of the steering wheel is not equal to the rotation direction of the motor, the steering angle signal is determined to have a fail and the fail-safe logic is operated.

In accordance with an aspect of the present invention, there is provided a system for detecting a fail of a steering angle sensor in an electric power steering apparatus, the system including: a steering angle sensor for generating and transmitting a steering angle signal measuring a rotation angle of a steering wheel; a motor for generating an assistant power for smooth steering and transmitting a current and a voltage based on rotation of the motor; and an Electronic Control Unit (ECU) for receiving the current and the voltage from the motor, sensing the rotation direction of the motor, receiving the steering angle signal from the steering angle sensor, sensing a first rotation direction of the steering wheel, and then, when the rotation direction of the motor is not equal to the first rotation direction of the steering wheel, determining that the steering angle signal has a fail and starting operation of a fail-safe logic.

In accordance with another aspect of the present invention, there is provided a system for detecting a fail of a steering angle sensor in an electric power steering apparatus, the system including: a steering angle sensor for generating and transmitting a steering angle signal measuring a rotation angle of a steering wheel; a motor including a position sensor for transmitting a motor position signal based on rotation of the motor and for generating an assistant power for smooth steering to be smoothly; and an ECU for receiving the motor position signal from the position sensor, sensing the rotation direction of the motor, receiving the steering angle signal from the steering angle sensor, sensing a first rotation direction of the steering wheel, and then, when the rotation direction of the motor is not equal to the first rotation direction of the steering wheel, determining that the steering angle signal has a fail and starting operation of a fail-safe logic.

In accordance with further aspect of the present invention, there is provided a method for detecting a fail of a steering angle sensor by an ECU inter-working with a motor in an electric power steering apparatus, the method including the steps of: (a) receiving a current and a voltage based on rotation of a motor from the motor, and sensing the rotation direction of the motor; (b) receiving an steering angle signal measuring a rotation angle of a steering wheel from a steering angle sensor, sensing a first rotation direction of the steering wheel, and checking if the rotation direction of the motor is equal to the first rotation direction of the steering wheel; and (c) determining that the steering angle sensor is mistakenly operated or that a fail exists in the steering angle signal when the rotation direction of the motor is not equal to the first rotation direction of the steering wheel according to a result of the checking in step (b), and operating a fail-safe logic.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1A:
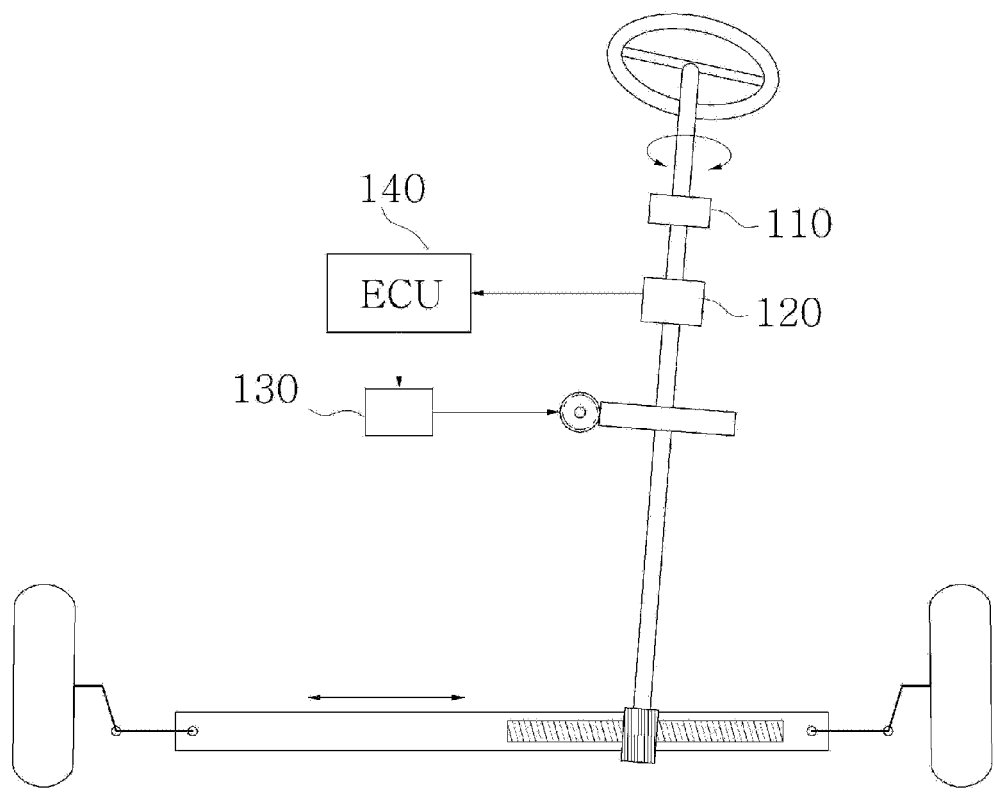
FIGS. 1A and 1B are block diagrams schematically illustrating a system for detecting a fail of a steering angle sensor in an electric power steering apparatus according to an exemplary embodiment of the present invention.

Hereinafter, an exemplary embodiment of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 1B:
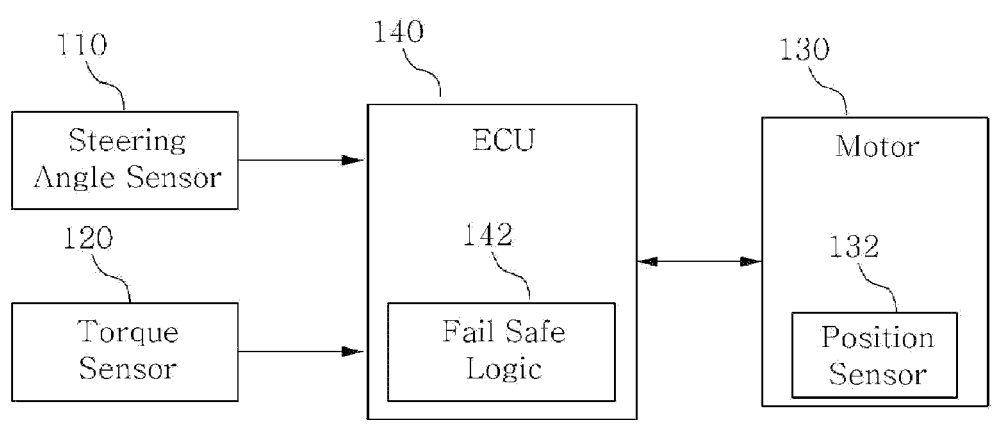

FIGS. 1A and 1B are block diagrams schematically illustrating a system for detecting a fail of a steering angle sensor in an electric power steering apparatus according to an exemplary embodiment of the present invention.

The system for detecting a fail of a steering angle sensor in the electric power steering apparatus by using a rotation direction of a motor according to the exemplary embodiment of the present invention includes a steering angle sensor 110, a torque sensor 120, a motor 130, and an ECU 140.

The steering angle sensor 110 generates a signal measuring a rotation angle of a steering wheel rotated by a driver's operation and transmits the signal to the ECU. For convenience of description, it will be described on the assumption that the signal measuring the rotation angle of the steering wheel and generated in the steering angle sensor 110 is a steering angle signal. Here, the steering angle signal includes a first rotation direction of the steering wheel.

The torque sensor 120 generates an electric signal sensing a relative rotational displacement between an input axis and an output axis according to rotation of the steering wheel and transmits the electric signal to the ECU 140. For convenience of description, it will be described on the assumption that the electric signal generated in the torque sensor 120 is a torque signal. Here, the torque signal includes a second rotation direction of the steering wheel.

The motor 130 generates and transmits assistant power for smoothly steering based on a control current supplied from the ECU 140, and transmits a current and a voltage based on rotation of the motor 130 to the ECU 140. Further, if the motor 130 is provided with a position sensor 132, the position sensor 132 outputs a motor position signal including a fixed code corresponding to the rotation direction of the motor.

The ECU 140 receives the steering angle signal from the steering angle sensor 110 and the torque signal from the torque sensor 120, and checks if a fail occurs in the signals. If the fail occurs in the signals according to a result of the check, the ECU transmits the control current for stopping a drive of the motor 130 according to a fail-safe logic 142 to the motor 130.

The ECU 140 according to the exemplary embodiment of the present invention receives the current and the voltage based on the rotation of the motor from the motor 130 and senses the rotation direction (a forward direction or a reverse direction) of the motor. In the meantime, if the motor 130 includes the position sensor 132, the ECU 140 receives the motor position signal including the fixed code corresponding to the rotation direction of the motor from the position sensor 132 so that the ECU 140 may sense the rotation direction of the motor.

The ECU 140 receives the steering angle signal measuring the rotation angle of the steering wheel from the steering angle sensor 110 to sense the first rotation direction of the steering wheel, and compares the first rotation direction of the steering wheel with the rotation direction of the motor, and checks if the first rotation direction of the steering wheel is equal to the rotation direction of the motor. As a result of the check, when the first rotation direction of the steering wheel is not equal to the rotation direction of the motor, it is determined that the steering angle sensor is mistakenly operated or that the fail exists in the steering angle sensor 110, so that the ECU receives the torque signal from the torque sensor 120 so as to sense the second rotation direction of the steering wheel from an output of the torque signal. The ECU 140 checks if the rotation direction of the motor is equal to the second rotation direction of the steering wheel. As a result of the check, when the rotation direction of the motor is not equal to the second rotation direction of the steering wheel, the ECU 140 determines that the steering angle sensor is mistakenly operated or that the fail exists in the steering angle signal, so that the ECU operates the fail-safe logic 142. Further, the ECU 140 shares the fail of the steering angle sensor 110 with either or both of an ESP and a suspension control apparatus.

Figure 2:
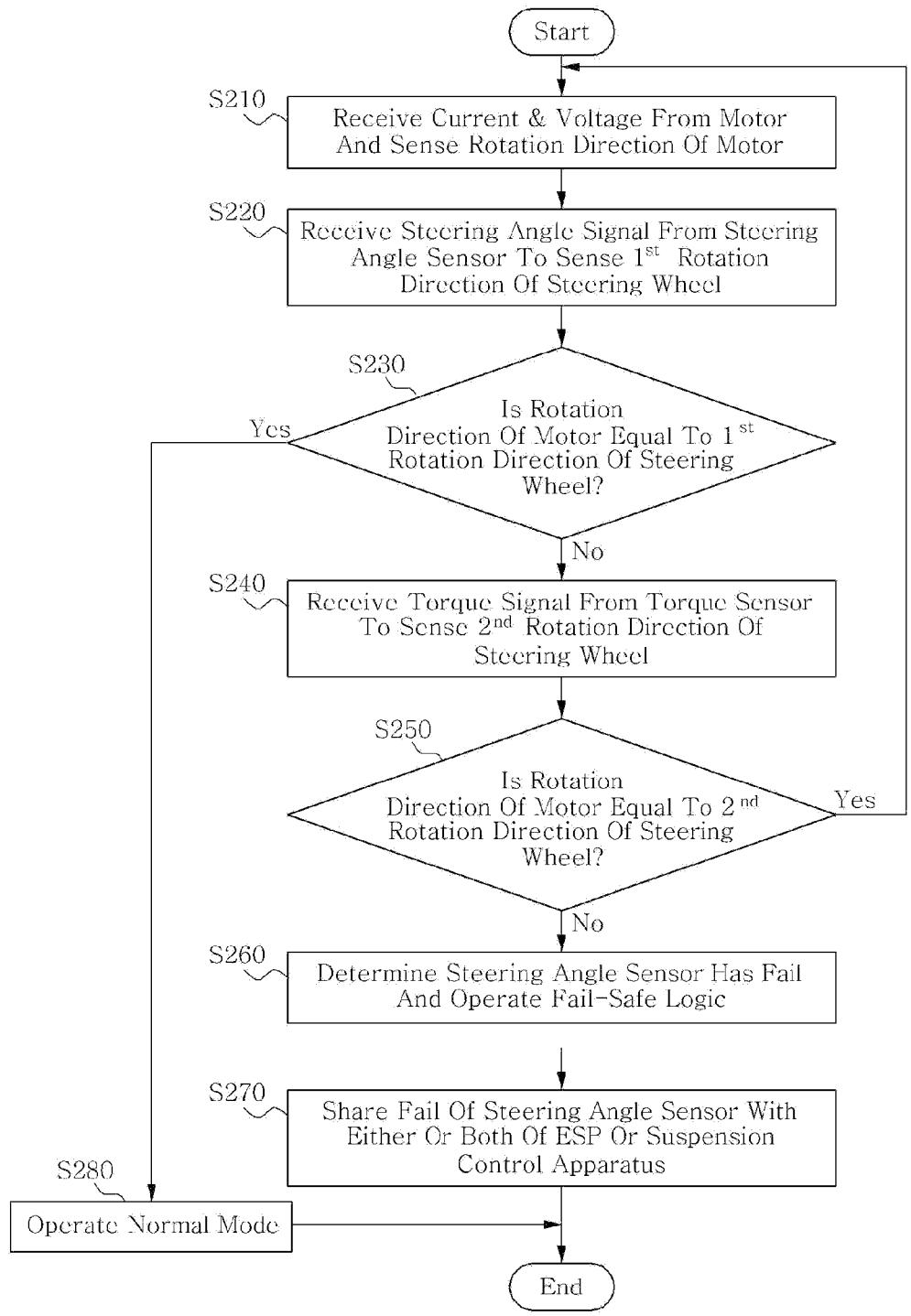
FIG. 2 is a flowchart illustrating a method for detecting a fail of a steering angle sensor in an electric power steering apparatus according to an exemplary embodiment of the present invention.

FIG. 2 is a flowchart illustrating a method for detecting a fail of a steering angle sensor in an electric power steering apparatus according to an exemplary embodiment of the present invention.

The ECU 140 receives the current and the voltage based on the rotation of the motor from the motor 130 and senses the rotation direction (i.e. a forward direction or reverse direction) of the motor (S210). Here, if the motor 130 includes the position sensor 132, the position sensor 132 transmits the motor position signal including the fixed code corresponding to the rotation direction of the motor to the ECU 140 so that the ECU 140 may sense the rotation direction of the motor by using the motor position signal.

The ECU 140 receives the steering angle signal measuring the rotation angle of the steering wheel from the steering angle sensor 110, and senses the first rotation direction of the steering wheel (S220). The ECU 140 checks if the first rotation direction of the steering wheel is equal to the rotation direction of the motor (S230).

As a result of the check in step S230, when the first rotation direction of the steering wheel is not equal to the rotation direction of the motor, the ECU 140 determines that the steering angle sensor 110 is mistakenly operated or that the fail exists in the steering angle sensor 110, and the ECU 140 receives the torque signal from the torque sensor 120, so as to sense the second rotation direction of the steering wheel from the output of the torque signal (S240).

The ECU 140 checks if the rotation direction of the motor is equal to the second rotation direction of the steering wheel (S250).

As a result of the check in step S250, when the rotation direction of the motor is not equal to the second rotation direction of the steering wheel, the ECU 140 determines that the steering angle sensor 110 is mistakenly operated or that the fail exists in the steering angle signal, so that the ECU 140 operates the fail-safe logic 142 and transmits the control current interrupting the drive to the motor 140 (S260).

When the ECU determines that the steering angle sensor 110 is mistakenly operated or that the fail exists in the steering angle signal, the ECU 140 shares the fail of the steering angle sensor 110 with either or both of the ESP and the suspension control apparatus (S270).

In the meantime, as a result of the check in step S230, when the first rotation direction of the steering wheel sensed from the steering angle signal is equal to the rotation direction of the motor sensed from the motor position signal (or current/voltage), the ECU 140 transmits the control current operating a normal mode to the motor 130 (S280).

As described above, according to the present invention, the current and the voltage are received from the motor to sense the rotation direction of the motor, the steering angle signal is received from the steering angle sensor to sense the first rotation direction of the steering wheel, and then it is checked if the rotation direction of the motor is equal to the first rotation direction of the steering wheel in such a manner that there is an effect that the fail of the steering angle sensor is accurately detected.

Further, even though the motor is not provided with the position sensor, the current and the voltage is received from the motor so as to sense the rotation direction of the motor, so that the expense for detecting the fail of the steering angle sensor can be reduced.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not to be limited by the above embodiment but by the claims and the equivalents thereof. It will be understood by those skilled in the art that various changes in form and details may be made therein without departing from the spirit and scope of the invention as defined by the appended claims.

What is claimed is:

1. A system for detecting a fail in an electric power steering apparatus, the system comprising:

a steering angle sensor generating and transmitting a steering angle signal that measures a rotation angle of a steering wheel;

a motor generating an assistant power for smooth steering and transmitting a current and a voltage based on operation of the motor; and an Electronic Control Unit (ECU) configured for:
   receiving the current and the voltage from the motor;
   determining a rotation direction of the motor based on the received current and voltage from the motor;
   receiving the steering angle signal from the steering angle sensor;
   determining a first rotation direction of the steering wheel from the received steering angle signal from the steering angle sensor;
   and then, determining that the steering angle signal has a fail based on the rotation direction of the motor determined from the received current and voltage from the motor, when the rotation direction of the motor is not equal to the first rotation direction of the steering wheel, and starting operation of a fail-safe logic.

2. The system as claimed in claim 1, further comprising a torque sensor for generating and transmitting a torque signal sensing a relative rotation displacement between an input axis and an output axis based on rotation of the steering wheel.

3. The system as claimed in claim 2, wherein the ECU receives the torque signal from the torque sensor so as to sense a second rotation direction of the steering wheel when the rotation direction of the motor is not equal to the first rotation direction of the steering wheel, and determines that the steering angle signal has the fail so as to operate the fail-safe logic when the rotation direction of the motor is not equal to the second rotation direction of the steering wheel.

4. The system as claimed in claim 1, wherein the ECU shares the fail of the steering angle signal with either or both of an Electronic Stability Program (ESP) and a suspension control apparatus.

5. A method for detecting a fail of a steering angle sensor by an Electronic Control Unit (ECU) inter-working with a motor in an electric power steering apparatus, the method comprising steps of:

(a) receiving from the motor a current and a voltage based on operation of the motor, and determining a rotation direction of the motor based on the received current and voltage from the motor;

(b) receiving from a steering angle sensor a steering angle signal that measures a rotation angle of a steering wheel, determining a first rotation direction of the steering wheel from the steering angle signal from the steering angle sensor, and determining if the rotation direction of the motor determined from the received current and voltage from the motor is equal to the first rotation direction of the steering wheel; and (c) when the rotation direction of the motor determined from the received current and voltage from the motor is not equal to the first rotation direction of the steering wheel, determining that the steering angle sensor is mistakenly operated or that the steering angle signal has a fail, and operating a fail-safe logic.

6. The method as claimed in claim 5, further comprising the steps of:

(d) receiving a torque signal from a torque sensor and sensing a second rotation direction of the steering wheel from the torque signal;

(e) checking if the rotation direction of the motor is equal to the second rotation direction of the steering wheel; and (f) operating the fail-safe logic when the rotation direction of the motor is not equal to the second rotation direction of the steering wheel.

7. The system as claimed in claim 1, wherein the current and the voltage used by the ECU to determine the rotation direction of the motor are an operating current and an operating voltage transmitted by the motor based on operation of the motor.

8. The system as claimed in claim 1, wherein the motor is not provided with a motor position sensor for sensing a rotation of the motor.

9. The method as claimed in claim 5, wherein the current and the voltage used to determine the rotation direction of the motor are an operating current and an operating voltage transmitted by the motor based on operation of the motor.

10. The method as claimed in claim 5, wherein the motor is not provided with a motor position sensor for sensing a rotation of the motor.

11. The method as claimed in claim 5, wherein the rotation direction of the motor is not determined using a motor position sensor for sensing a rotation of the motor.

* * * * *